United States Patent
Bradley et al.

(10) Patent No.: US 6,930,466 B2
(45) Date of Patent: Aug. 16, 2005

(54) BATTERY CHARGER

(75) Inventors: Larry Bradley, San Diego, CA (US); Jim Pieronek, San Diego, CA (US); Frank Newman, Chula Vista, CA (US)

(73) Assignee: Kyocera Wireless Corp., San Diego, CA (US)

( * ) Notice: Subject to any disclaimer, the term of this patent is extended or adjusted under 35 U.S.C. 154(b) by 111 days.

(21) Appl. No.: 10/321,122

(22) Filed: Dec. 17, 2002

(65) Prior Publication Data

US 2004/0113591 A1 Jun. 17, 2004

(51) Int. Cl.[7] .................................................. H02J 7/00
(52) U.S. Cl. ..................................... 320/133; 320/134
(58) Field of Search ................................ 320/133, 134, 320/124, 125, 136, 137, 155, 158, 159, 160, 162, 163

(56) References Cited

U.S. PATENT DOCUMENTS 5,115,182 A * 5/1992 Ehmke et al. ............... 320/136
6,285,166 B1 * 9/2001 Cannon ....................... 320/134

* cited by examiner

*Primary Examiner*—Donald Sparks
*Assistant Examiner*—Lawrence Luk

(57) ABSTRACT

In an embodiment of the present invention, a charge voltage is coupled between the positive and negative terminals of a rechargeable battery, to charge the battery. The charge voltage is disconnected for a predetermined relax time period. A rechargeable battery voltage is present between the positive and negative terminals of the battery during the relax time. The battery voltage is measured and compared to a predetermined target voltage that is associated with a sample time. The comparison is then used to determine if the battery is charged.

16 Claims, 9 Drawing Sheets

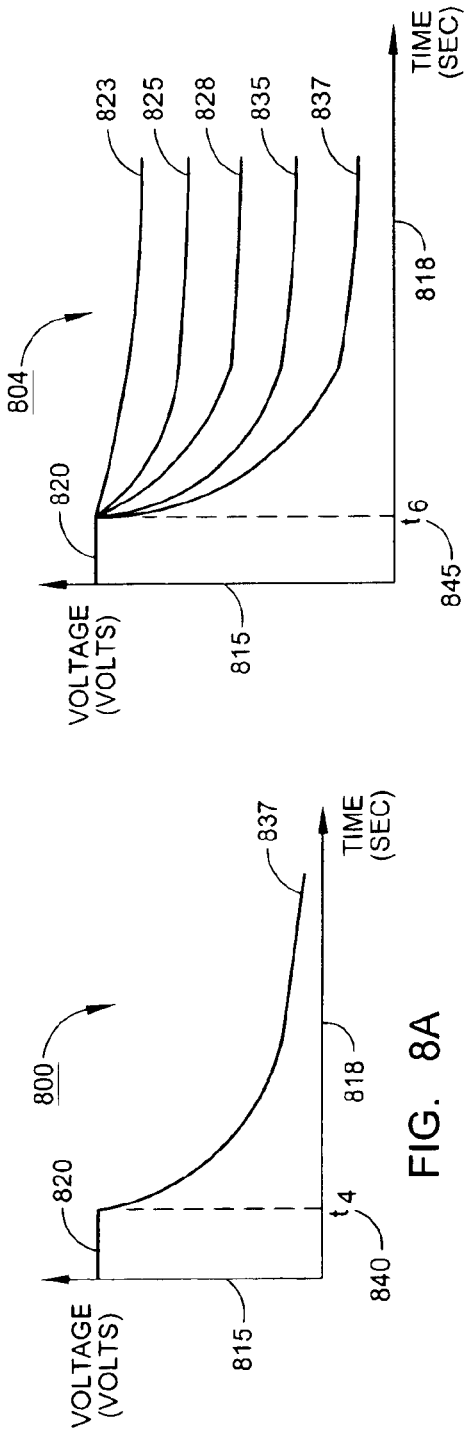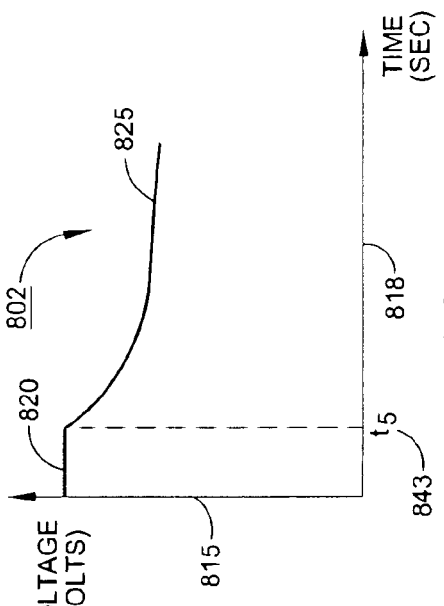
FIG. 8A
FIG. 8B
FIG. 8C

BATTERY CHARGER

FIELD

The present invention relates generally to electronic devices, and more particularly to battery charging devices.

BACKGROUND

Portable electronic devices are becoming more and more ubiquitous. Batteries typically power these portable electronic devices. Typically, rechargeable batteries are used to power these portable electronic devices. Charging the rechargeable batteries is an important consideration. The users of portable electronic devices desire products that can operate on a single charge for as long as possible and can recharge in as short a time as possible. Shortening the amount of time that it takes to recharge a battery is an important design consideration.

A known method of charging a rechargeable battery will now be discussed with reference to FIG. 10. FIG. 10 shows a graph 1000 of voltage and current versus time. Voltage is plotted along a first y-axis 1005 on the left side of the graph 1000 and current is plotted along a second y-axis 1007 on the right side of the graph 1000. Time is plotted along the x-axis 1008.

The graph 1000 shows charging voltage 1012 and charging current 1015. During a first charging time 1018 which is indicated on the graph 1000 as $\Delta t_{pa1}$ a constant current is applied to the charging terminals. After the rechargeable battery reaches a predetermined voltage 1003 the rechargeable battery is charged using a constant voltage, shown on the graph 1000 as part of charging voltage 1012. The constant voltage is applied to the charging terminals during a second charging time 1021, which is indicated on the graph 1000 as $\Delta t_{pa2}$. At time $t_{pa3}$ 1029 the charging current has reached a predetermined level and the rechargeable battery is considered charged. When the rechargeable battery is considered charged the charging current 1015 is turned off 1023. When the charging current 1015 is turned off 1023 the rechargeable battery voltage may drop 1026.

Determining when the charging current 1015 has reached the predetermined level adds complexity and expense to the battery charging circuit. While it is true that current can be calculated by measuring the voltage across a resistor, this method has several drawbacks. Adding a resistor increases energy losses in the battery charging circuit. It is less complicated to measure the voltage at a single point relative to a reference point. Another known method that uses a voltage measurement will be discussed with respect to FIG. 11.

Another graph 1100 of voltage and current versus time is shown on FIG. 11, which relates to a known method for battery charging. To overcome the difficulties in measuring current as discussed with respect to FIG. 10 voltage 1112 is used to indicate the level of charge of the rechargeable battery. However, the voltage across the terminals of the rechargeable battery is not an accurate indication of the level of charge while the charging voltage is applied to the terminals of the rechargeable battery. The current 1115 is turned off at various times during the charging of the rechargeable battery. Charging current and voltage are reapplied to the rechargeable battery after the voltage 1112 drops to a predetermined level 1118.

As is shown in FIG. 11 a disadvantage of this method of charging is that as the rechargeable battery is charged it takes longer and longer for the voltage to drop to the predetermined level 1118. The off time is shown as $\Delta t_{pa4}$ 1121, $\Delta t_{pa5}$ 1123, and $\Delta t_{pa6}$ 1126. As shown each successive off time increases in length and continues off the graph 1100. Since the rechargeable battery is not charging during these off times, this increases the amount of time it takes to charge the rechargeable battery. It will take the longest amount of time to add charge to the rechargeable battery when charging is nearly complete. A way is needed to determine when a rechargeable battery is fully charged without relying on current measurements and without turning off the charging current for long periods of time.

The method of charging batteries discussed with respect to FIG. 11 is known as pulse charging. As discussed above, when pulse charging is used to charge a rechargeable battery the amount of time that the charging current is off increases as the rechargeable battery gets closer to being fully charged. An example of a component that uses pulse charging techniques to charge a rechargeable battery is the National Semiconductor LM3626 Lithium Ion (Li—Ion) Battery Pulse Charge Controller. The LM3626 is described in National Semiconductor, LM3626 Li-Ion Battery Pulsed Charger Controller, Jan. 7, 2000, Preliminary Information.

SUMMARY

It is therefore an object of the present invention to provide a battery charger that will generally charge more efficiently than a pulse charger. An additional object of the present invention is to provide an efficient and relatively quick method for charging a rechargeable battery. The methods and circuitry that incorporate these methods may be useful in portable electronic devices, as well as other devices requiring battery power from a rechargeable battery.

In an embodiment of the present invention, a charge voltage is coupled between the positive and negative terminals of a rechargeable battery, to charge the battery. The charge voltage is disconnected for a predetermined relax time period. A rechargeable battery voltage is present between the positive and negative terminals of the battery during the relax time. The battery voltage is measured and compared to a predetermined target voltage that is associated with a sample time. The comparison is then used to determine if the battery is charged.

Advantageously, using relaxed charging will generally charge the rechargeable battery more quickly than a pulse charger using the same charging current, assuming the off time for the pulse charger increases as the rechargeable battery is charged. When using relaxed charging the off time is not required to increase as the rechargeable battery gets closer to being fully charged. In one embodiment the relax time is constant.

Generally relaxed charging provides a more accurate indication of how fully charged the rechargeable battery is. For example, with pulse charging, the battery charging circuit re-engages the battery charging circuit when the battery voltage has dropped to a threshold without any consideration of how long it has taken for the battery voltage to drop to the threshold. When relaxed charging is used the voltage is measured at a predetermined time to predict how fully charged the rechargeable battery is.

BRIEF DESCRIPTION OF THE DRAWINGS AND TABLES

For a more complete understanding of the present invention, and the advantages thereof, reference is now made to the following descriptions taken in conjunction with the accompanying drawings, tables and attachments, in which:

In FIG. 5 charging time is estimated using the first two relax time periods.

In FIG. 6 the first charging time is longer than subsequent charging times.

FIG. 7 is similar to FIG. 5, however, the charging time is estimated using the first relax time period instead of the first two relax time periods.

FIG 8A-show voltage curve 837.

FIG 8B-show voltage curve 825.

FIG 8C-show several additional voltage curves 823, 828 and 835.

Figure 9:
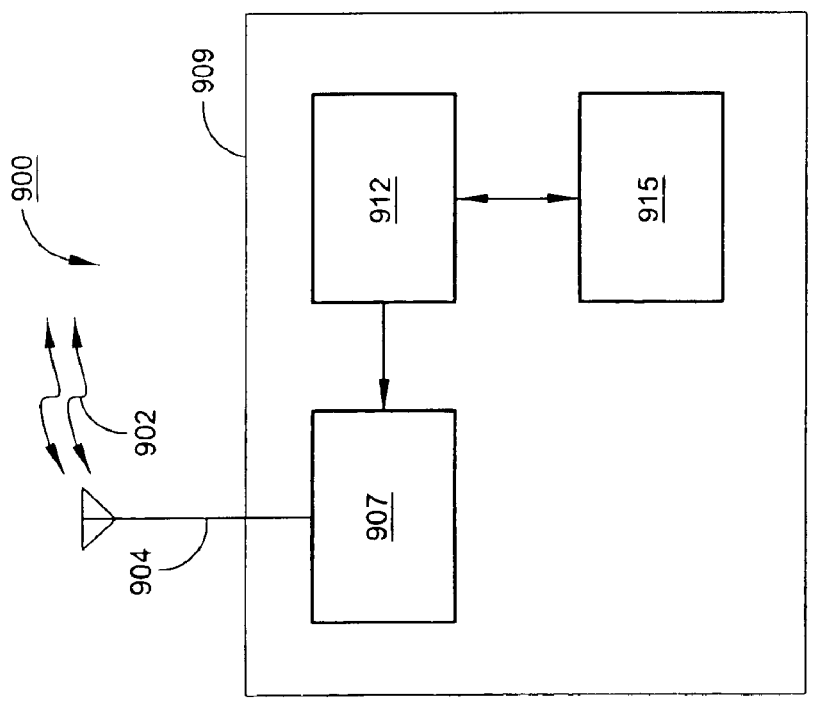

FIG. 9 is a mobile communications device 900.

Figure 10:
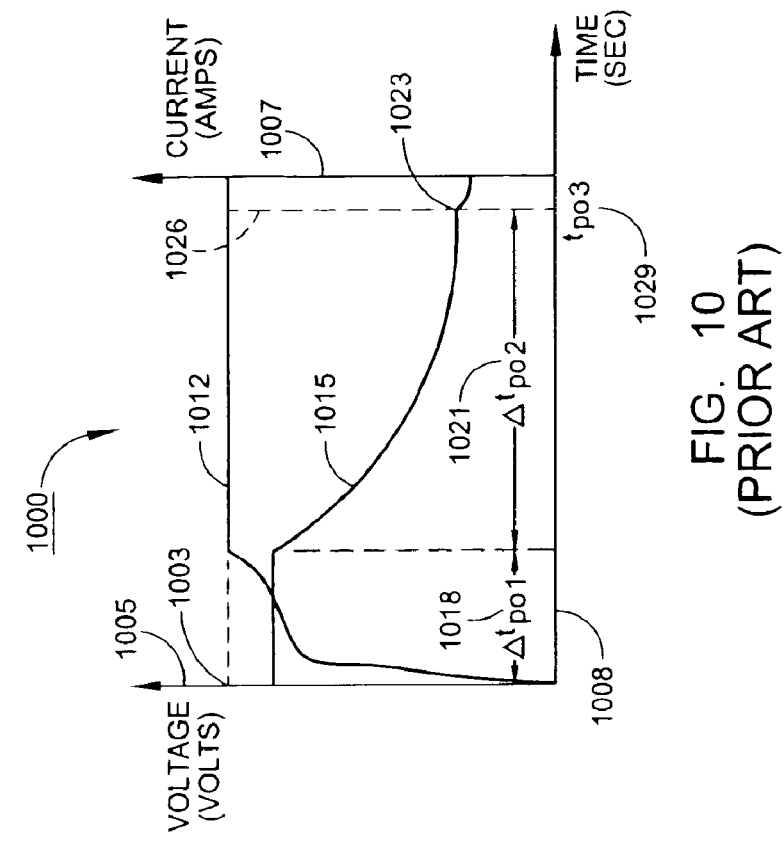

FIG. 10 prior art, a graph of voltage and current versus time for a battery charger that measures current to determine when charging is complete.

Figure 11:
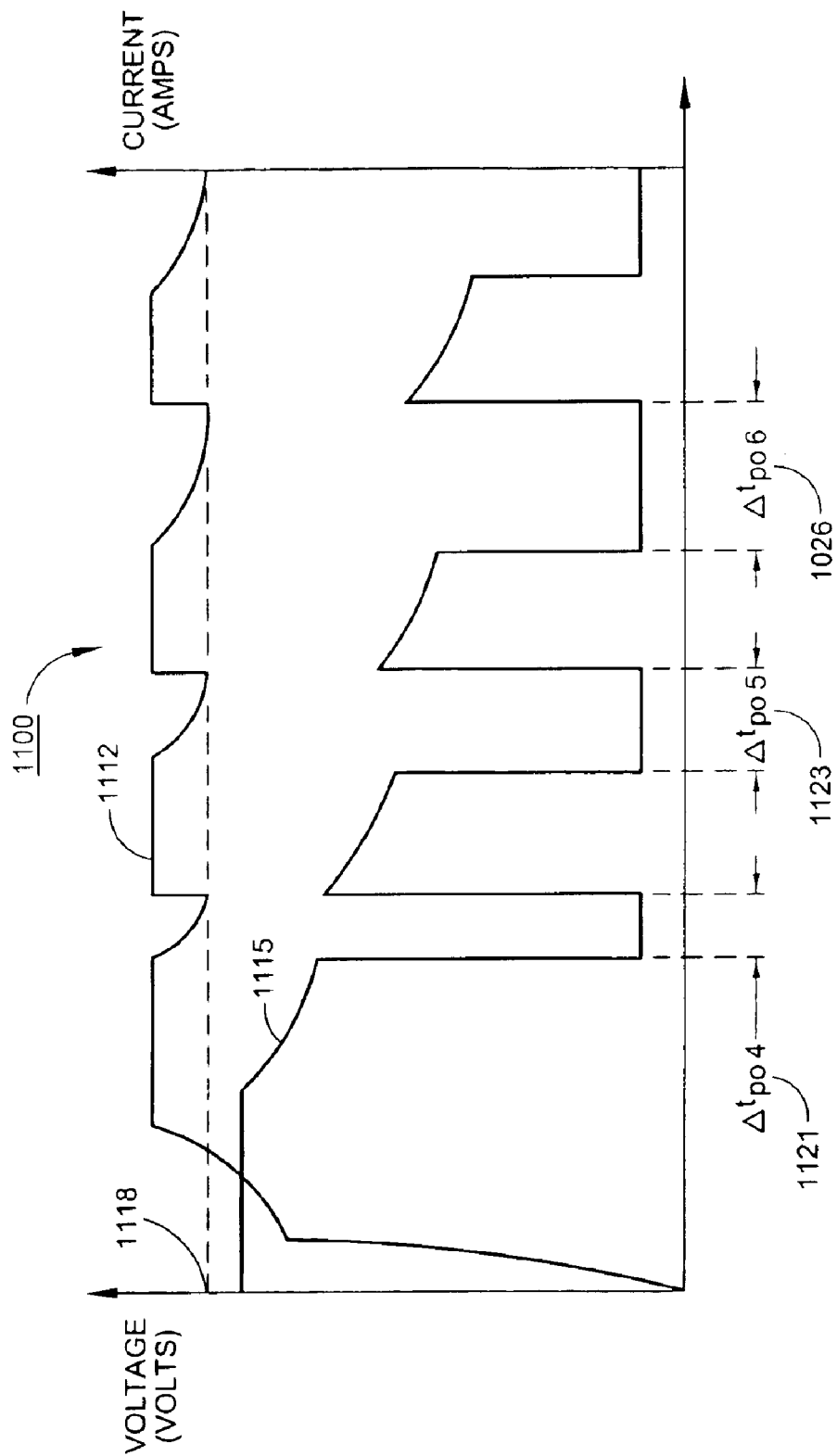

FIG. 11 prior art, a graph of voltage and current versus time for a battery charger that uses pulse charging.

Use of the same reference symbols in different figures indicates similar or identical items.

DETAILED DESCRIPTION

Figure 1:
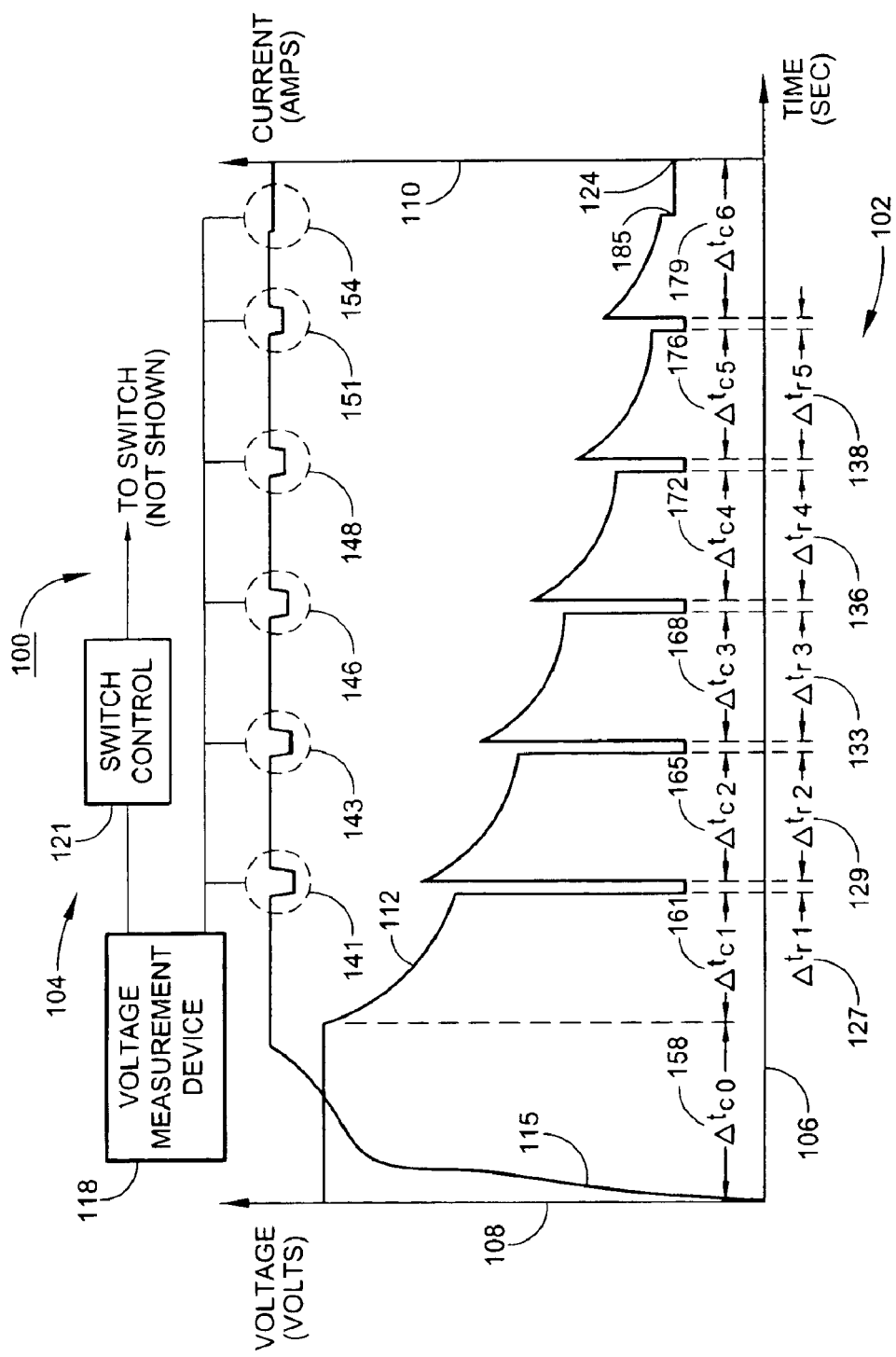
FIG. 1 depicts a voltage measuring device and switch control and includes a graph that illustrates voltage and current versus time as they would be applied to the charging terminals of a rechargeable battery in one embodiment.

Referring now to FIG. 1, an embodiment of the battery charger will now be discussed. A diagram describing a battery charger 100 consists of a graph 102 and circuitry 104. The graph 102 shows a plot that represents the voltage 115 across the battery terminals of a rechargeable battery. A second plot represents the charging current 112 supplied to the terminals of the rechargeable battery 115. Voltage is shown with respect to a first y-axis 108 on the left side of the graph 102 and current is shown with respect to a second y-axis 110 on the right side of the graph 102. The x-axis 106 represents time.

The circuitry 104 controls the application of voltage 115 and current 112 to the battery terminals. The circuitry 104 may contain a voltage measuring device 118 and a switch control 121. The voltage measuring device 118 is used to measure the battery voltage at a sample time. Sample time will be discussed further with respect to FIG. 3.

The switch control 121 controls a switch. The switch connects and disconnects the rechargeable battery to a voltage source that supplies power to charge the rechargeable battery. The graph shows relax time periods, $\Delta t_{r1}$ 127, $\Delta t_{r2}$ 129, $\Delta t_{r3}$ 133, $\Delta t_{r4}$ 136, and $\Delta t_{r5}$ 138. The relax times 127, 129, 133, 136, 138 are periods when the switch control causes the switch to disconnect the voltage source from the rechargeable battery. As will be discussed with respect to FIG. 3, the sample times occur during the relax times when the voltage source is disconnected from the rechargeable battery. The switch and voltage source will be discussed in more detail with respect to FIG. 4.

It is important to note that while five relax times are shown, this is for illustrative purposes only, and the number of relax times can vary. In some cases, if the rechargeable battery is nearly charged, the number of relax times may actually be less than five, however, when a rechargeable battery is nearly discharged the number of relax times can be much greater than five. The number of relax times will also vary for different batteries, different battery chemistries, and for different battery charger implementations.

During each relax time 127, 129, 133, 136, 138, the voltage on the terminals of the battery will drop. This is known as the open circuit voltage drop, shown at 141, 143, 146, 148, 151, 154. Prior to the open circuit voltage drop 141, 143, 146, 148, 151, 154 the battery charger 100 supplies voltage 115 and current 112. When the charging voltage is removed the voltage across the terminals of the rechargeable battery drops and the rechargeable battery supplies the lower voltage. As the rechargeable battery approaches full charge, the open circuit voltage drop 141, 143, 146, 148, 151, 154 decreases.

Several battery charging times are shown. The first battery charging time 158, $\Delta t_{c0}$ is a constant current charging time. Six additional charging times 161, 165, 168, 172, 176, 179 are shown $\Delta t_{c1}, \Delta t_{c2}, \Delta t_{c3}, \Delta t_{c4}, \Delta t_{c5}, \Delta t_{c6}$. The six additional charging times 161, 165, 168, 172, 176, 179 are predetermined charging times. While the predetermined charge times are shown to be approximately equal, it will be understood by one of skill in the art that different predetermined charge times are possible. The predetermined charge time may be fixed, or may be calculated based on battery conditions. Calculating the predetermined charge time will be discussed further with respect to FIGS. 5, 6, and 7. As discussed with respect to relax times 127, 129, 133, 136, 138, the number of charging times 161, 165, 168, 172, 176, 179 will vary.

When the rechargeable battery is determined to be fully charged an end cycle 185 will occur. The end cycle 185 may include disconnecting the charging voltage 115 from the rechargeable battery and dropping the charging current 112 to a low level 124, preferably zero. Additionally, the current during the relax times will typically be the same low level 124. If the battery is connected to the battery charger for an extended period of time the charging voltage 115 may be connected to the rechargeable battery causing current 112 to flow keeping the rechargeable battery fully charged.

A typical battery charging operation will now be described with respect to FIG. 1. Time increases from left to right along the x-axis 106.of the graph 102. At the far left of the graph 102, next to the y-axis 108 the start of a typical battery charging operation is shown. At the start of a typical battery charging operation the switch control 121, causes the switch to close. Closing the switch connects the voltage source to the rechargeable battery.

The first battery charging time 158 is shown on FIG. 1 as $\Delta t_{c0}$. During the first battery charging time 158 the voltage source operates in a constant current mode. During this part of the battery charging process the voltage begins to rise as a constant current is supplied to the rechargeable battery. It will be clear to one of skill in the art that the constant current part of the battery charging process can be split into multiple periods of time. Additionally, each of the multiple periods of time can have different constant current levels supplied to the rechargeable battery during that period of time. Note that the charging current 112 refers to the entire line on the graph, not just the portion near the reference character 112.

After the voltage on the terminals of the rechargeable battery reaches a predetermined level the charging circuit charges the rechargeable battery using a voltage that is held constant for a predetermined period of time. During the second charging time 161, $\Delta t_{c1}$, the voltage is held constant. At the end of the second charging period 161 the switch control 121 causes the switch to open. Opening the switch disconnects the voltage source from the rechargeable battery. The first relax time 127 occurs at the end of the second charging period 161. During the first relax time 127 the first open circuit voltage drop 141 occurs.

The voltage measuring device 118 measures the voltage at a voltage reference point during the first relax time 127. The voltage reference point will be discussed further with respect to FIG. 4. The switch control determines when the battery being charged is fully charged. The determination that the rechargeable battery is fully charged is based on the voltage measured at the voltage reference point during the relax times 127, 129, 133, 136, 138. As the open circuit voltage increases the rechargeable battery is closer to being fully charged. The fall off of battery voltage after the removal of the charge voltage changes as a rechargeable battery is charged. This change is discussed further with respect to FIGS. 8A, 8B, and 8C. The constant voltage part of the battery charging process is repeated until the rechargeable battery is fully charged.

When the battery is determined to be fully charged an end cycle 185 is initiated. The end cycle 185 is responsive to the comparison of a target voltage and the voltage measured at the voltage reference point during the relax time 138. The end cycle 185 will be known to those of skill in the art. As stated above, the end cycle 185 may include, but not be limited to disconnecting the charging voltage 115 from the rechargeable battery and dropping the charging current 112 to a low level 124, preferably zero. Additionally, the end cycle 185 may include, but not be limited to trickle charging the battery, or periodically testing the battery to determine if the battery charging process should be restarted to compensate for internal losses in the battery.

Figure 2:
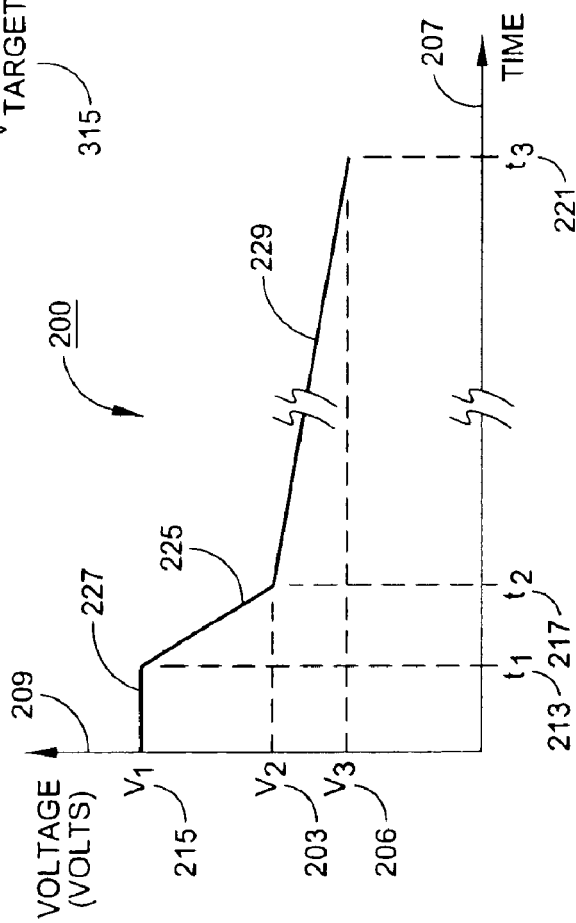
FIG. 2 is a graph of rechargeable battery voltage versus time showing the fall off of rechargeable battery voltage after the charging voltage is removed.

Referring now to FIG. 2 a graph 200 of battery voltage versus time will be discussed. The graph 200 consists of a y-axis 209 representing voltage and an x-axis 207 representing time. The graph 200 shows a plot of the voltage across the positive and negative terminals of a rechargeable, battery. The voltage shown on the graph is shown at a first, higher level, while a charging voltage 227 is applied across the positive and negative terminals of the rechargeable battery.

When the charge voltage 227 is removed the voltage across the positive and negative terminals of the rechargeable battery begin to decrease. An initial decrease 225 is shown on the graph 200. After the initial decrease 225 a slower decrease 229 occurs. These battery characteristics will now be discussed in further detail below.

On the left side of the graph 200, prior to time $t_1$ 213 a charge voltage 227 equal to $V_1$ 215 is applied to the rechargeable battery. At time $t_1$ 213 the charge voltage 227 is disconnected from the rechargeable battery and the battery voltage begins to decrease 225. At time $t_2$ 217 the voltage has dropped to $V_2$ 203. This decrease 225 occurs rapidly. After the initial decrease 225 the voltage drops off more gradually. As stated above, the slower decrease 229 is shown on the graph 200. From time $t_2$ 217 to time $t_3$ 221 the voltage drops from $V_2$ 203 to $V_3$ 206.

The graph 200 is meant to depict the general characteristics of a rapid decrease 225 followed by a slower decrease 229. Exact characteristics of a particular rechargeable battery will vary for different batteries and different battery chemistries. It will be clear to those of skill in the art that the voltage across the terminals of the rechargeable battery may not fall off linearly.

In one particular case, it was determined that the voltage dropped 90% of what it would drop in a twenty-four hour period during the first five seconds. In other words, if you measure the voltage of a rechargeable battery immediately prior to the rechargeable battery being disconnected from a voltage source and measured it again twenty-four hours later the results would be as follows. If the voltage measured were 4.250 volts immediately prior to disconnecting the voltage source and 3.830 volts twenty-four hours later the voltage on the rechargeable battery will drop as follows. The battery would drop to 3.872 volts in the first five seconds and only another 0.042 volts in the following 24 hours. In one embodiment the sample time occurs five seconds after the start of the relax time period. It is again noted that this example is for a specific battery. Other batteries and other battery chemistries may give different results.

Figure 3:
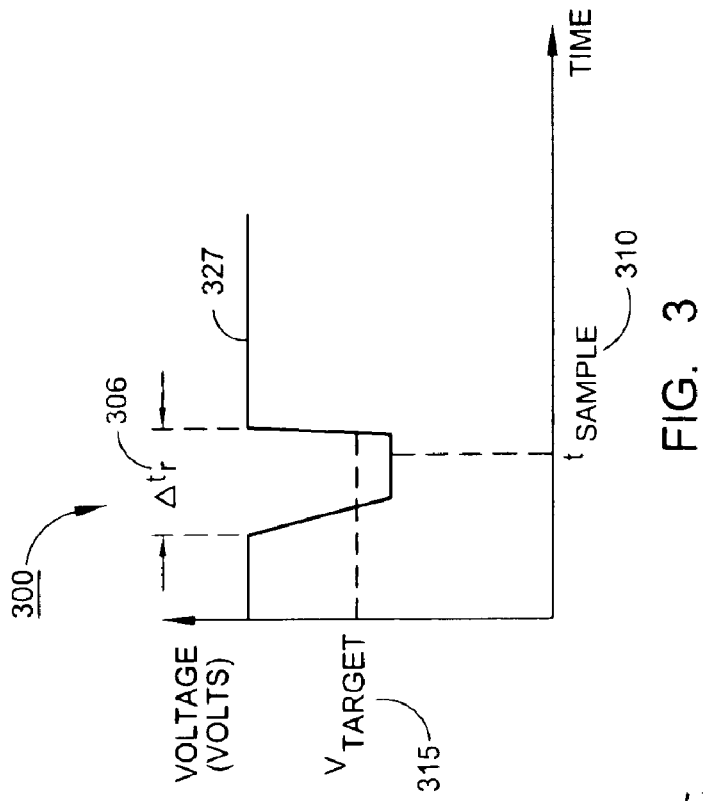
FIG. 3 is a graph of rechargeable battery voltage versus time showing one relax time and one sampled time.

FIG. 3, a graph 300 of battery voltage versus time will now be discussed. The graph 300 shows one relax time 306 and one sampled time 310. When the charge voltage is disconnected from the terminals of the battery the charging cycle enters the relax time 306. The relax time 306 is shown as time $\Delta t_r$ on the graph 300. During the relax time 306 the open circuit voltage drop occurs. Open circuit voltage drops 141, 143, 146, 148, 151, 154 were shown on FIG. 1. The sample time 310, $t_{sample}$, is also shown on the graph 300. At the sample time 310 the voltage across the terminals of the rechargeable battery is measured. The time between the start of the relax time 306 and sample time 310 is known as the wait time. Additionally, the graph 300 shows a target voltage 315, $V_{target}$. The target voltage 315 was discussed with respect to FIG. 1 and will be further described here. The target voltage 315 can be a specific predetermined voltage, however, it will be clear to those of skill in the art that the target voltage 315 can also be a relative voltage. For example, the target voltage 315 can be a predetermined voltage drop below the charge voltage 327. The target voltage 315 is an indicator that is used to determine when the rechargeable battery is considered to be fully charged.

Generally, a rechargeable battery is defined to be fully charged when it stores enough electrical energy to supply the rated current supplying capacity of the battery. The rated current supplying capacity of the battery is generally specified by the battery manufacturer and measured in ampere-hours. For example, the current supplying capacity of a rechargeable battery may be 0.9 ampere-hours. However, it will be clear to those of skill in the art that defining when a battery is fully charged is a nearly arbitrary decision that can be made based on the specific application being considered.

As was discussed with respect to FIG. 11 previously, the voltage across the terminals of the rechargeable battery is not an accurate indication of the level of charge while the charging voltage is applied to the terminals of the rechargeable battery. The rechargeable battery has internal resistance. When current is flowing into the battery a voltage drop will occur across the rechargeable battery's internal resistance. The sample time 310 occurs during the relax time 306 when the charge voltage is disconnected from the terminals of the battery and current is not flowing into the battery.

Battery voltage, when the current flowing into the battery is low, and ideally zero, is an indicator of the level of charge for the rechargeable battery. The voltage that is measured during the sample time 310 is used to determine if the rechargeable battery is charged. As will be discussed with respect to FIG. 5 and FIG. 7, this voltage measurement can also be used to estimate how long to continue charging the rechargeable battery. FIG. 3 is similar to FIG. 2, however the charge voltage 327 is reapplied to the rechargeable battery after the sample time 310.

Figure 4:
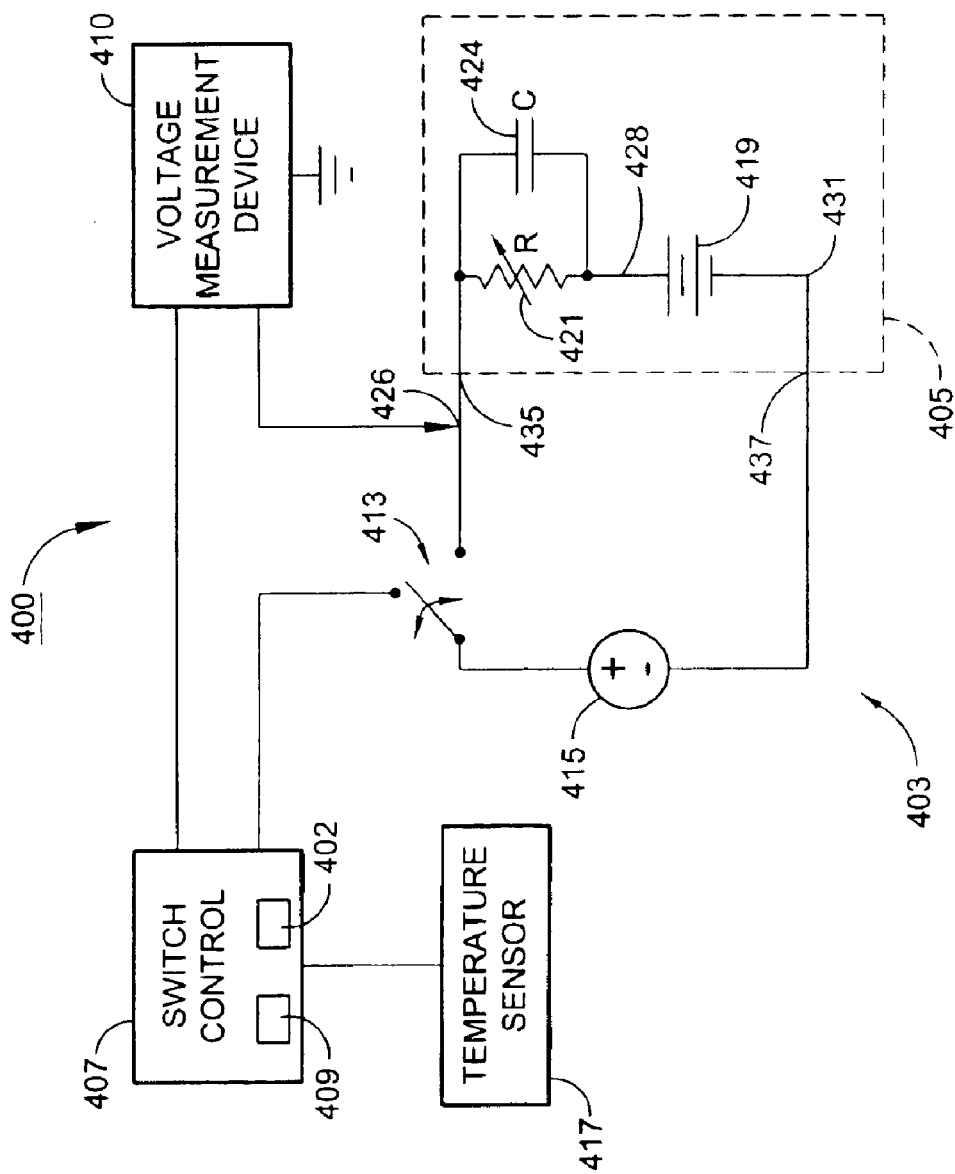
FIG. 4 is a circuit diagram showing one model of a rechargeable battery connected to circuitry that implements one embodiment of a relaxed charging device.

FIG. 4 is a circuit diagram 400. The circuit diagram 400 shows a model 405 of a rechargeable battery. The model 405 of a rechargeable battery contains an ideal rechargeable battery 419, a negative terminal 431, and a positive terminal 428. The model 405 also includes a variable resistor 421, and a capacitor 424.

The model 405 of a rechargeable battery has a reference point 437 and a positive output 435. The reference point 437 and the positive output 435 are coupled to a charging circuit 403. The charging circuit 403 comprises a voltage source in the form of a power supply 415, a switch 413, a voltage measuring device 410, and a switch control 407. The voltage measuring device 410 can be an analog-to-digital converter or analog circuitry.

The switch control 407 includes a processor 409 and memory 402. The processor 409, could be a microprocessor or microcontroller and includes oscillator circuitry. The oscillator circuitry provides a clock to the processor and can be used to determine when to start relax times and when sample times should occur. Analog circuitry can also be used to determine timing for relax time and sample times. The memory 402 can be used to store the wait time and the target voltage 315 from FIG. 3. Additionally, the memory can store voltage measurements used by the processor 409 to determine the state of the rechargeable battery that is being charged.

Additionally, the switch control 407 can include analog circuitry. Optionally a temperature sensor 417 can be included in the circuit 403.

The voltage measuring device 410 is coupled to a voltage reference point 426. The power supply 415 is coupled to the model 405 of a rechargeable battery through a switching device in the form of a switch 413. The switching device may be a mechanical switch, a relay, or a transistor. The switch 413 is controlled by the switch control 407. The switch control causes the power supply 415 to be connected and disconnected from the rechargeable battery. Additionally, the temperature sensor 417 can cause the switch control 407 to turn off if the temperature is outside of the specified temperature range of the rechargeable battery.

Figure 5:
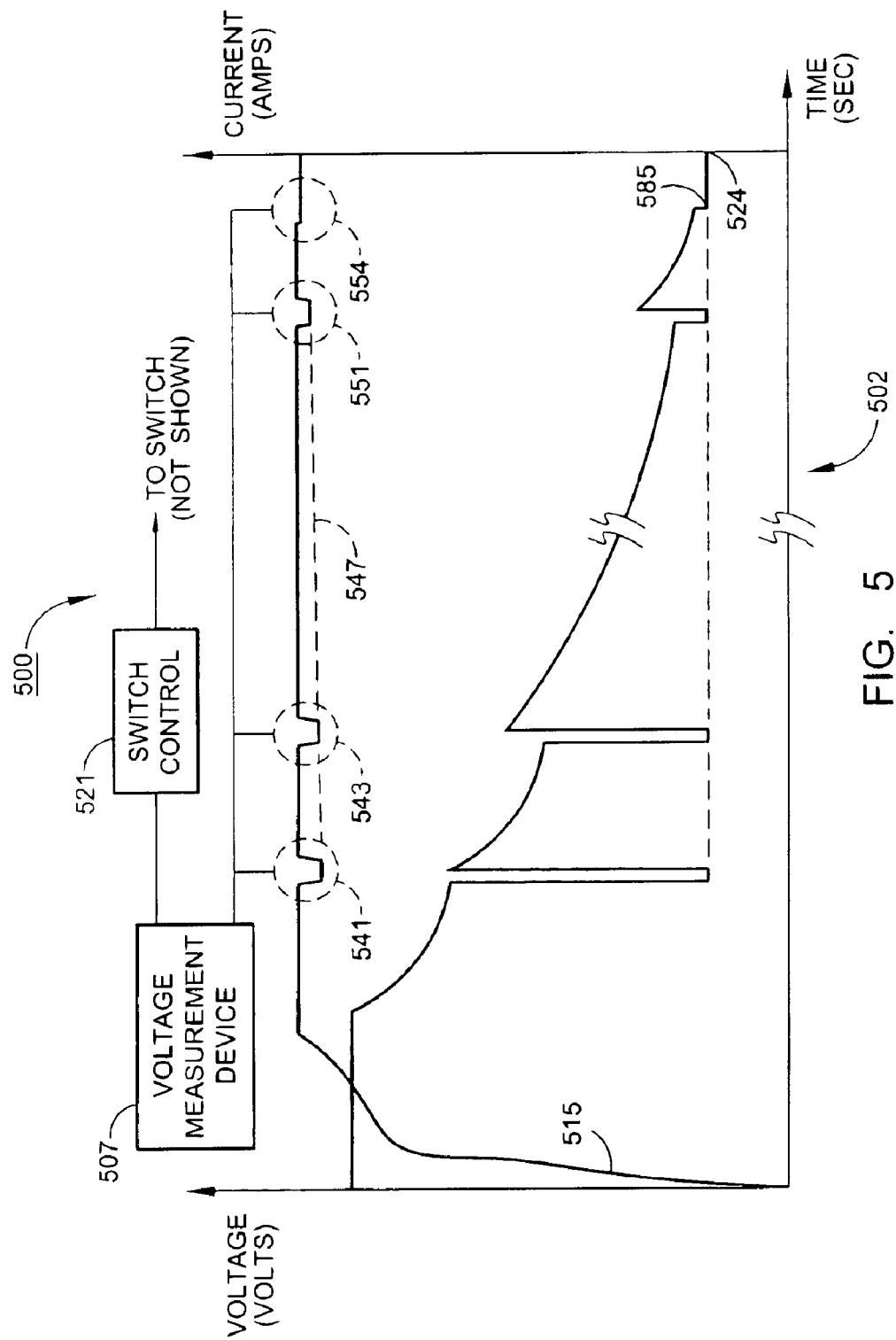
FIG. 5 depicts a voltage measuring device and switch control and includes a graph that illustrates voltage and current versus time as they would be applied to the charging terminals of a rechargeable battery in another embodiment.

Referring now to FIG. 5, another diagram 500 describing a battery charger will now be discussed. The diagram 500 describes a battery charger and is similar to FIG. 1. The diagram 500 is made up of a graph 502 showing voltage and current as a function of time. The graph 502 plots voltage 515 and current 512. The plot of voltage 515 includes open circuit voltage drops 541, 543, 551, 554. After open circuit voltage drop 554 an end cycle 585 occurs. The first two open circuit voltage drops 541, 543 are used to estimate how long it will take to charge the rechargeable battery. The estimate is then used to determine when the switch control 521 should disconnect the charge voltage from the rechargeable battery.

As shown on the graph 502, determining when a line 547 will intersect with the voltage line 515 establishes the estimate. On the graph 502, the intersection of the line 547 and the voltage line 515 occurs near the open circuit voltage drop 551. This is expected since, as stated above, the switch control 521 disconnects the charge voltage based on the estimate. The point where line 547 intersects the voltage line 515 occurs when the charge voltage is being applied.

While line 547 is shown, other estimations are possible. For example, an estimator that is non-linear can be used. As another option, estimators that compare the line 547 to a voltage that is not equal to the voltage line 515 are also possible. Additionally, different estimating techniques may be necessary for different types of batteries. It will also be clear to one of skill in the art that the estimation can be repeated if it is determined that the battery is not fully charged when open circuit voltage drop 551 is measured.

It will be clear to one of skill in the art that many different estimating techniques are possible. The switch control 521 in FIG. 5 is similar to those shown and described in FIGS. 1 and 4. Additionally, it will be appreciated by one of skill in the art that a single switch control can be built that implements multiple embodiments.

Figure 6:
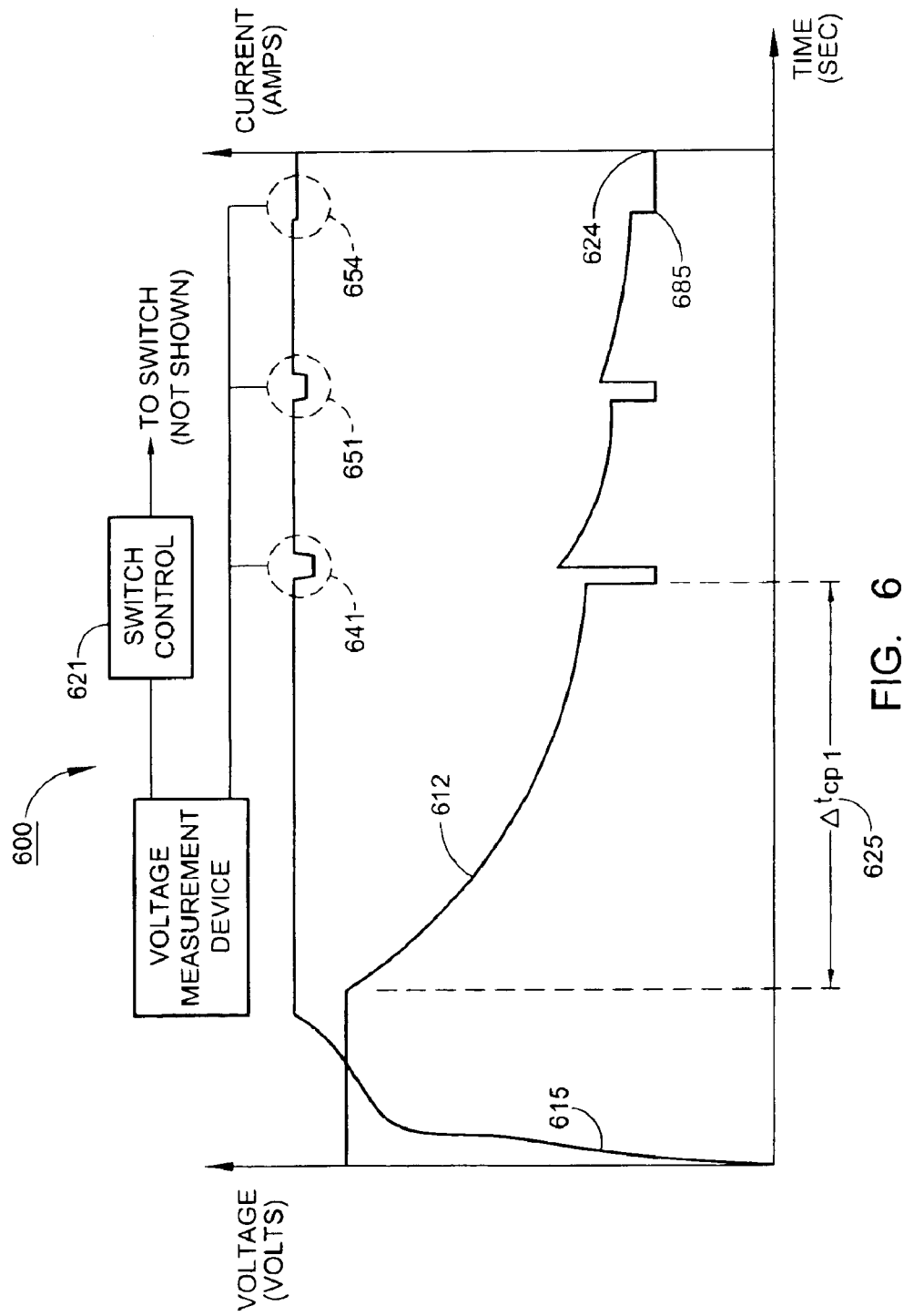
FIG. 6 depicts a voltage measuring device and switch control and includes a graph that illustrates voltage and current versus time as they would be applied to the charging terminals of a rechargeable battery in another embodiment.

FIG. 6, another diagram 600 describing a battery charger will now be discussed. FIG. 6 is similar to FIGS. 1 and 5. FIG. 6 shows a plot of voltage 615 and current 612. Additionally, open circuit voltage drops 641, 651, 654 and a low current level 624 are shown. A switch control 621 similar to those in FIGS. 1, 4 and 5 is used to control a switch that connects and disconnects a charging current to the rechargeable battery.

FIG. 6 has a longer initial charging period 625, $\Delta t_{cp1}$. With knowledge of the initial charge condition of the rechargeable battery the battery charger can charge the rechargeable battery for a long initial period and then measure the open circuit voltage drops 641, 651, 654 to determine when charging is complete. After open circuit voltage drop 654 an end cycle 685 occurs. While three open circuit voltage drop measurements are shown it will be clear to one of skill in the art that different numbers of open circuit voltage drop measurements are possible.

Figure 7:
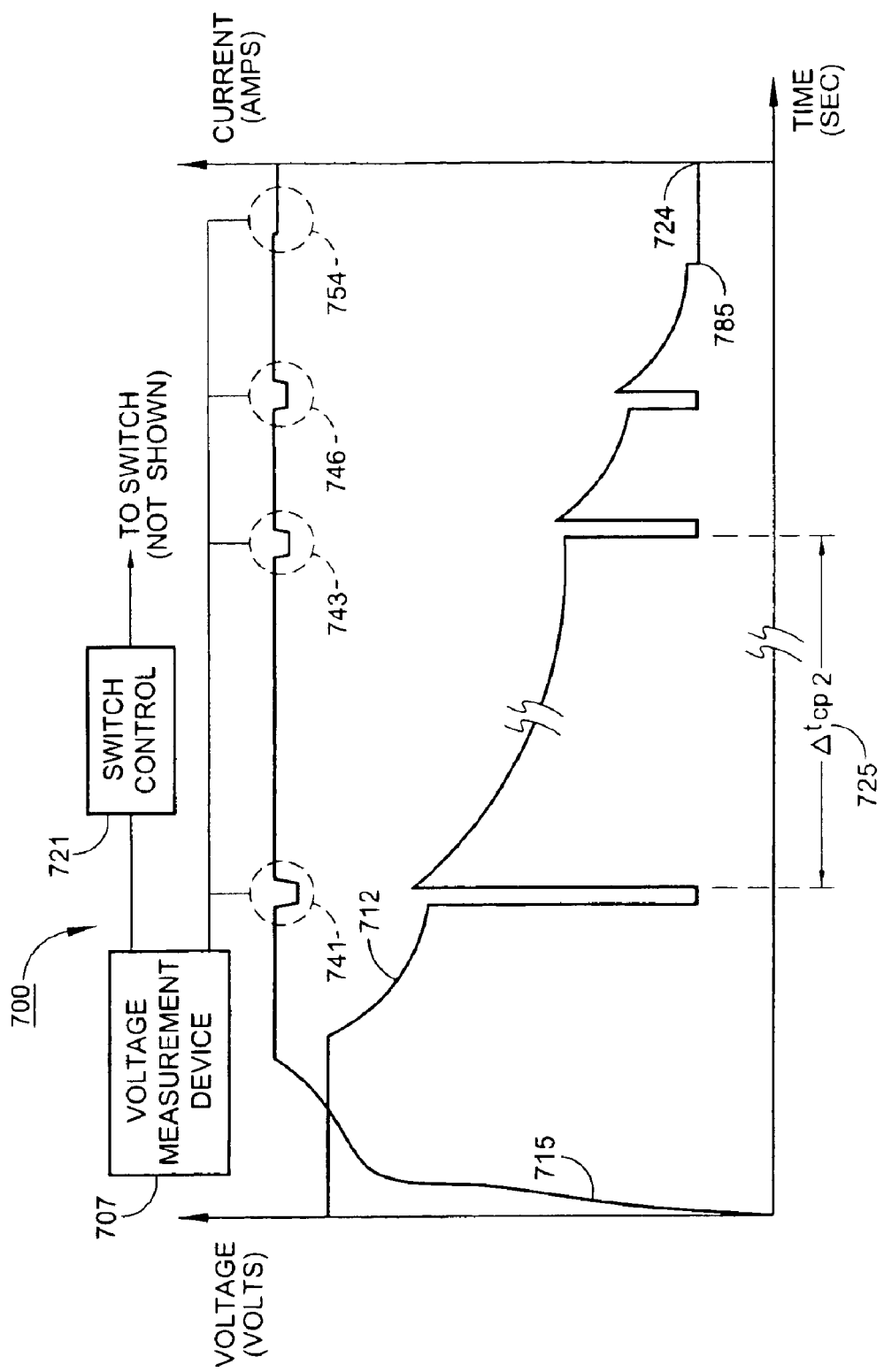
FIG. 7 depicts a voltage measuring device and switch control and includes a graph that illustrates voltage and current versus time as they would be applied to the charging terminals of a rechargeable battery in another embodiment.

FIG. 7, is another diagram 700 describing a battery charger. The diagram 700 is similar to FIGS. 1, 5, and 6. The switch control 721 and voltage measuring device 707 are used to measure the initial open circuit voltage drop 741. The initial open circuit voltage drop 741 is used to estimate how long it will take to charge the rechargeable battery. After an initial charging period 725, $\Delta t_{cp2}$ open circuit voltage drops 743 746 754 are used to determine when the rechargeable battery is charged.

While FIG. 7 shows a single estimate of how long it will take to charge the rechargeable battery, followed by relax times during open circuit voltage drops 743, 746, 754, multiple estimates are possible. Additionally, while three open circuit voltage drops 743, 746, 754 are shown after the initial open circuit voltage drop 741, other numbers of open circuit voltage drops 734, 746, 754, are possible. The more accurate the estimate during the open circuit voltage drop 741 is the fewer number of relax times will occur following the initial charging period 725. After open circuit voltage drop 754 an end cycle 785 occurs. A switch control 721 similar to those in FIGS. 1, 4, 5, and 6 is used to control a switch that connects and disconnects a charging current to the rechargeable battery. Again a single switch control can be implemented that would incorporate some or all of the embodiments.

FIG. 8A, a graph 800 of voltage versus time will now be described. The graph 800 has an x-axis 818 and a y-axis 815. The x-axis 818 is time and the y-axis 815 is voltage. The graph 800 shows an initial voltage 820. The initial voltage 820 occurs when a charging voltage is being applied to the rechargeable battery. At time $t_4$ 840 the charging current is disconnected from the rechargeable battery. After time $t_4$ 840 the voltage decreases. Voltage curve 837 shows the voltage decrease.

As the rechargeable battery is charged the voltage decreases that occur, after removing the charge voltage 820, will not be as large a decrease. For example, FIG. 8B shows voltage curve 825. At time $t_5$ 843 the charge voltage 820 is removed. The rechargeable battery is more fully charged at time $t_5$ than at time $t_4$ as shown by comparing voltage curve 825 of FIG. 8B to voltage curve 837 of FIG. 8A.

FIG. 8C, a graph 800 of voltage versus time will now be discussed. FIG. 8C is a composite of FIG. 8A and 8B, with several additional voltage curves 823, 828, an 835 shown. The time $t_6$ 845 is meant to be any time when the charge voltage 820 is removed. Depending on the level of charge for the rechargeable battery a different voltage curve 823, 825, 828, 835, 837 will occur. The voltage curves 823, 825, 828, 835, 837 are not meant to be discreet states, they are merely examples of possible voltage curves. Additionally, as stated with respect to FIG. 2, The graphs 200 and 800 are meant to depict the general characteristics. Exact characteristics of a particular rechargeable battery will vary for different batteries and different chemistries. It will be clear to one of skill in the art that the charge level of the rechargeable battery prior to the beginning of the battery charge cycle will also affect the voltage curve at the end of a charge cycle.

Another embodiment will now be discussed with respect to FIG. 9. FIG. 9 shows a mobile communications device 900. The mobile communications device 900 comprises a case 909, and transceiver 907. The transceiver 907 is coupled to a battery 912. The battery 912 supplies power to the transceiver 907. The battery 915 is charged using a battery charger 915. The battery charger 915 can be constructed in accordance with the embodiments shown and described herein. However other embodiments of the battery charger 915 will occur to those of skill in the art. FIG. 9 also shows an antenna 904 that sends and receives radio frequency (rf) signals 902.

A system and method for charging a battery have been presented. Examples of embodiments of the invention have been shown. The system and method are applicable to a wide range of electronic devices, including, but not limited to, wireless communications devices. Other variations and embodiments of the invention will occur to those skilled in the art.

What is claimed is:

1. A mobile handset comprising:
   a transceiver for transmitting and receiving rf signals;
   a rechargeable battery coupled to the transceiver for supplying power to the transceiver;
   a case enclosing the transceiver and the rechargeable battery;
   means for storing a predetermined wait time;
   means for starting a relax time period by decoupling the charge voltage from the rechargeable battery;
   means for determining a sample time, whereby the sample time is the wait time after the start of the relax time period;
   means for storing a target voltage whereby the target voltage is associated with the sample time;
   means for measuring a voltage of the rechargeable battery at the sample time;
   means for comparing the measured voltage to the target voltage; and
   means for coupling the charging voltage to the rechargeable battery responsive to the comparison step.

2. A mobile handset comprising:
   a transceiver for transmitting and receiving rf signals;
   a rechargeable battery coupled to the transceiver for supplying power to the transceiver;
   a case enclosing the transceiver and the rechargeable battery;
   means for storing a predetermined wait time;
   means for starting a relax time period by decoupling the charge voltage from the rechargeable battery;
   means for determining a sample time, whereby the sample time is the wait time after the start of the relax time period;
   means for storing an associating a target voltage with the sample time;
   means for measuring a voltage of the rechargeable battery at the sample time;
   means for comparing the measured voltage to the target voltage; and,
   means for determining that the rechargeable battery is fully charged responsive to the comparison step.

3. A mobile handset, comprising:
   a rechargeable battery;
   a battery charger coupled to the rechargeable battery, the battery charger configured to charge the battery by supplying a constant voltage to the rechargeable battery during a charge time period;
   a switch control coupled with the battery charger, the switch control configured to cause the constant voltage to be decoupled at the end of the charge time from the rechargeable battery for a relax time period; and
   a measuring device configured to measure a voltage associated with the rechargeable battery during a sample time period that occurs a certain wait time after the start of the relax time period, to compare the measured voltage to a target voltage, and to cause the switch control to allow the constant voltage to be supplied to the rechargeable battery for a second charge time when the measured voltage is less than or equal to the target voltage.

4. The mobile handset of claim 3, wherein the measuring device is further configured to cause the battery charger to stop supplying the constant voltage when the measured voltage is equal to or greater than the target voltage.

5. The mobile handset of claim 3, wherein the battery charger is configured to supply the constant voltage for a plurality of charge times, and wherein the switch control is configured to decouple the constant voltage from the rechargeable battery at the end of each of the plurality of charge times.

6. The mobile handset of claim 5, wherein the measuring device is configured to measure a voltage associated with the rechargeable battery after a wait time from the beginning of a relax time period begun each time the switch control decouples the constant voltage.

7. The mobile handset of claim 3, wherein the wait time is about 5 seconds.

8. The mobile handset of claim 3, wherein the measured voltage is used to estimate the length of the second charge time period.

9. The mobile handset of claim 3, wherein the battery charger is configured to supply a constant current to the rechargeable battery prior to supplying the constant voltage.

10. A method for charging a rechargeable battery, comprising:
supplying a constant voltage to the rechargeable battery during a charge time period;
decoupling the constant voltage at the end of the charge time from the rechargeable battery for a relax time period;
measuring a voltage associated with the rechargeable battery during a sample time period that occurs a certain wait time after the start of the relax time period;
comparing the measured voltage to a target voltage; and
allowing the constant voltage to be supplied to the rechargeable battery for a second charge time when the measured voltage is less than or equal to the target voltage.

11. The method of claim 10, further comprising ceasing to supplying the constant voltage when the measured voltage is equal to or greater than the target voltage.

12. The method of claim 10, further comprising supplying the constant voltage for a plurality of charge times, and decoupling the constant voltage from the rechargeable battery at the end of each of the plurality of charge times.

13. The method of claim 12, further comprising measuring a voltage associated with the rechargeable battery after a wait time from the beginning of a relax time period begun each time the switch control decouples the constant voltage.

14. The method of claim 10, wherein the wait time period is about 5 seconds.

15. The method of claim 3, further comprising estimating the length of the second charge time period based on the measured voltage.

16. The method of claim 3, further comprising supplying a constant current to the rechargeable battery prior to supplying the constant voltage.

* * * * *